(12) United States Patent
Dooley et al.

(10) Patent No.: US 8,549,235 B2
(45) Date of Patent: Oct. 1, 2013

(54) METHOD FOR DETECTING ADDRESS MATCH IN A DEEPLY PIPELINED PROCESSOR DESIGN

(75) Inventors: Miles Robert Dooley, Austin, TX (US); Scott Bruce Frommer, Cold Spring, NY (US); David Allen Hrusecky, Cedar Park, TX (US); Sheldon B Levenstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/297,199

(22) Filed: Nov. 15, 2011

(65) Prior Publication Data

US 2012/0297162 A1 Nov. 22, 2012

Related U.S. Application Data

(63) Continuation of application No. 11/054,262, filed on Feb. 9, 2005, now abandoned.

(51) Int. Cl.
*G06F 12/00* (2006.01)

(52) U.S. Cl.
USPC ............ 711/150; 711/216; 711/140; 717/129

(58) Field of Classification Search
None
See application file for complete search history.

(56) References Cited

U.S. PATENT DOCUMENTS

| | | | | |
|---|---|---|---|---|
| 5,889,981 A * | 3/1999 | Betker et al. | ................... | 712/227 |
| 6,331,957 B1 * | 12/2001 | Kurts et al. | ................... | 365/201 |
| 6,477,664 B1 * | 11/2002 | Hong | ............................... | 714/35 |
| 6,581,140 B1 * | 6/2003 | Sullivan et al. | ............... | 711/128 |
| 2004/0139293 A1 * | 7/2004 | Barth et al. | ................... | 711/158 |

OTHER PUBLICATIONS

Kessler et al. (Inexpensive Implementations of Set-Associativity, pub. 1989, by ACM 0884-07495/89/0000/0131), pp. 131-139.*

* cited by examiner

*Primary Examiner* — Kaushikkumar Patel
(74) *Attorney, Agent, or Firm* — Yudell Isidore Ng Russell PLLC (57) ABSTRACT

A method, apparatus and algorithm for quickly detecting an address match in a deeply pipelined processor design in a manner that may be implemented using a minimum of physical space in the critical area of the processor. The address comparison is split into two parts. The first part is a fast, partial address match comparator system. The second part is a slower, full address match comparator system. If a partial match between a requested address and a registry address is detected, then execution of the program or set of instructions requesting the address is temporarily suspended while a full address match check is performed. If the full address match check results in a full match between the requested address and a registry address, then the program or set of instructions is interrupted and stopped. Otherwise, the program or set of instructions continues execution.

20 Claims, 5 Drawing Sheets

METHOD FOR DETECTING ADDRESS MATCH IN A DEEPLY PIPELINED PROCESSOR DESIGN

BACKGROUND OF THE INVENTION

1. Technical Field

The present invention relates generally to an improved data processing system, and in particular to a method and apparatus for processing data. Still more particularly, the invention relates to a method, apparatus, and algorithm for detecting address match in a deeply pipelined processor design.

2. Description of Related Art

To facilitate debugging of both hardware and software, many processors employ a detector mechanism that can detect an access to a given instruction or data address. A data address is an address that identifies a location of data in memory, including random access memory (RAM), non-volatile memory such as a hard drive, or any other form of memory. Broadly, the detector mechanism is a register that contains the address of interest and a circuit that compares an incoming request for address to the registry to determine whether a match exists. If a match exists, then the program or set of instructions requesting the address may be terminated in order to prevent errors from arising within the program or within the data processing system as a whole, or simply to allow a change of program control. Alternatively, the address match mechanism need not terminate the program. Instead, the address match mechanism may also acknowledge that an address match occurred by setting a bit in a register, or perform a similar action. In either case, the detection of the address match may be used to check the state of the machine, check the program data, or verify some other aspect of the hardware, the set of instructions executed, data related to the process, or other aspects of the data processing system.

For processors managing large address ranges, such as 64-bit addresses, the straightforward approach of comparing every bit is impracticable when the cycle time is reduced, especially in highly pipelined processors. The many levels of gates needed to perform the comparison use an unacceptably long processor cycle time. Furthermore, the many levels of gates needed require an unacceptably large amount of physical space on the processor chip. Thus, a comparator circuit is needed that both reduces the amount of time within a cycle that is needed to perform a match check and occupies a small area on the processor chip.

The problem of designing a comparator system to perform match checking is exacerbated by the fact that the comparator system should be physically located in the area of the critical timing path of the processor. This location is preferred because the input to the comparator is the address that is to be accessed by the processor, and because the address is likely to lie on the critical timing path.

Because the comparator circuit should be located in a critical physical area of the processor chip and because many other circuits benefit from being physically placed in the critical area, the physical area used by the comparator circuit should be as small as possible. Furthermore, the problem of designing the comparator system is further exacerbated in multi-threaded designs where a unique address of interest exists for each thread. Thus, a great number of register values are held for comparison. Accordingly, it would be advantageous to have an improved method, apparatus, and algorithm for reducing the amount of time within a processor cycle needed to perform a match check.

SUMMARY OF THE INVENTION

The present invention provides a method, apparatus and algorithm for performing an address match check in a deeply pipelined processor. The method includes the steps of requesting an address, performing a partial match check, and performing a full match check if the first set of bits matches the second set of bits. The partial match check compares a first set of bits contained in a requested address to a second set of bits contained in a registry address, wherein the registry address is stored in an address registry. The full match check compares all bits in the requested address to all bits in the registry address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
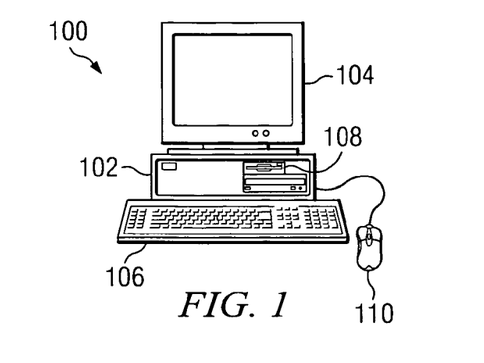
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
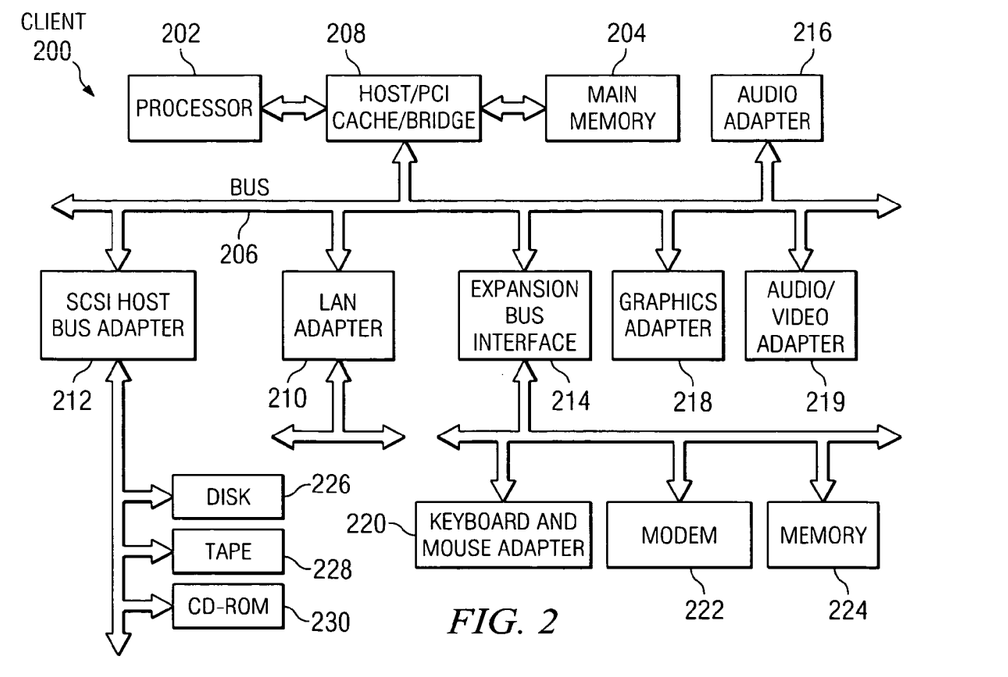
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. In addition, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus and algorithm for quickly detecting an address match in a deeply pipelined processor design in a manner that uses minimal space and cycle time on a processor chip. The address comparison check is split into two parts. The first part is a fast, partial address match comparator system physically located in or near the critical timing path of the processor chip. The second part is a slower, full address match comparator system physically located in a less critical part of the processor chip. The fast comparator system performs a partial address match check against a subset of the entire bit range of the registry address and the requested address. If a partial match is detected, then forward progress of a program or set of instructions is temporarily suspended. Subsequently, the larger, full address match comparator system performs a full address match check. If the full address match check results in the registry address matching the requested address, then the program or set of instructions is interrupted; otherwise, the program or set of instructions is allowed to continue.

Figure 3:
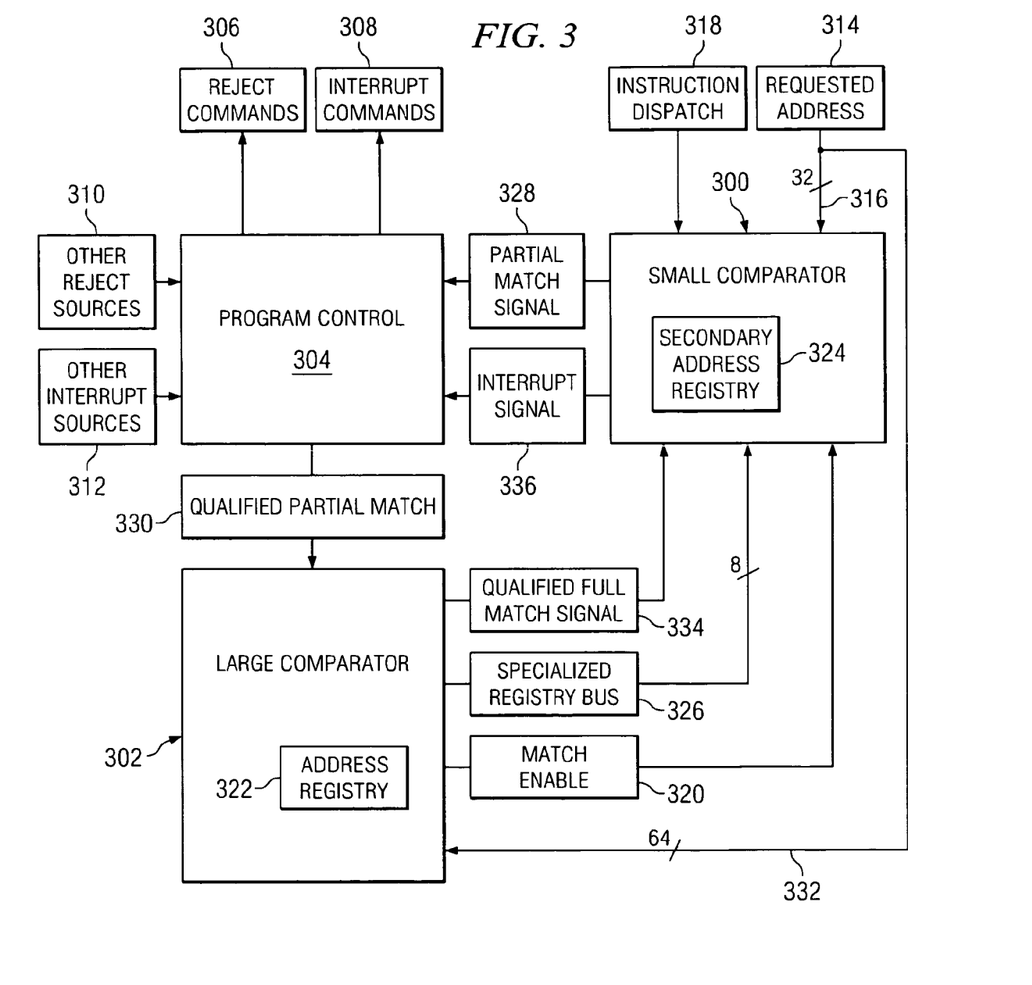
FIG. 3 is a block diagram of a two-part address comparison mechanism in a pipelined processor, in accordance with a preferred embodiment of the present invention.

FIG. 3 is a block diagram of a two-part address comparison mechanism in a pipelined processor, in accordance with a preferred embodiment of the present invention. The two-part address comparison mechanism shown in FIG. 3 may be implemented in data processing system 200 of FIG. 2, and in particular in processor 202 of FIG. 2. The system shown in FIG. 3 is a match check mechanism.

The two-part address comparison mechanism broadly includes small comparator 300 and larger comparator 302. Both small comparator 300 and larger comparator 302 interact with a program control mechanism 304 that governs interrupts, rejects, and requests for address matches. Thus, program control 304 may generally control all reject commands 306 based on signals from other reject sources 310 that may indicate that a reject command should be issued. Similarly, program control 304 may generally control all interrupt commands 308 based on other interrupt sources 312 that indicate that an interrupt command should be issued.

Small comparator 300 is small in the sense that it physically occupies a relatively small portion on a critical or crowded portion of the processor chip. Small comparator 300 is fast compared to larger comparator 302 because it is designed to compare a smaller number of bits than larger comparator 302. Larger comparator 302 is larger in the sense that it physically occupies more space on the processor chip than small comparator 300. Larger comparator is located on a less critical or less crowded portion of the processor chip. In an illustrative embodiment, larger comparator 302 is slower than small comparator 300 because larger comparator is designed to compare a full 64 bit addresses.

In another illustrative embodiment, larger comparator 302 may be designed to compare only the bits of the requested address and the registry address not checked by small comparator 300. The result of this comparison is a secondary match check. Subsequently, the results of the partial match check and the secondary match check are combined to perform a full match check. By combining the partial match check and the secondary match check, all 64 bits of each address are compared. Thus, large comparator 302 need not be a full 64-bit comparator, but may be a 40-bit comparator.

The number of bits the larger comparator is designed to handle may be larger or smaller than 40 bits, depending on how many bits small comparator 300 is designed to handle. Using less than a full 64-bit comparator requires some additional control and handshaking compared to using a full 64-bit comparator. However, a processor design where larger comparator 302 handles less than 64 bits uses less overall space on the processor chip and may speed up the overall process of performing a full match check compared to a processor design that has a larger comparator 302 that is designed to handle 64 bits and a smaller comparator 300.

Both small comparator 300 and larger comparator 302 may contain additional circuitry that provides a means for transmitting the various signals described elsewhere herein. Both small comparator 300 and larger comparator 302 may contain additional circuitry that provides for a means for maintaining and accessing one or more address registries or secondary address registries, including one or more busses for transmitting data in those registries. Thus, both small comparator 300 and larger comparator 302 comprise comparator systems.

Broadly, the mechanism of the present invention operates by splitting an address match check into two parts. First, a partial match check is performed by small comparator 300. The partial match check is performed by comparing less than all of the 64 bits of the requested address to a comparable number of bits of each registry address in an address registry. A partial match occurs if the checked bits of the requested address match the checked bits of a registry address. If a partial match does not occur, then the program or set of instructions requesting the address is allowed to continue execution.

If a partial match occurs, then larger comparator 302 performs a full match check by comparing all 64 bits of the requested address to all 64 bits of each registry address in the address registry. While larger comparator 302 performs the full match check, execution of the program or set of instructions is suspended via a means for transmitting a reject signal. The means for transmitting a reject signal may be any suitable means for transmitting a signal in a processor chip. A full match occurs if all bits of the requested address match all bits of an address in the address registry.

If a partial match does occur, but a full match does not occur, then the program or set of instructions requesting the address is allowed to continue execution. If a full match occurs, then program control 304 issues an interrupt command via a means for transmitting an interrupt signal. The means for transmitting an interrupt signal may be any suitable means for transmitting a signal in a processor chip. The program or set of instructions requesting the address then stops or terminates.

In a more detailed illustrative embodiment, requested address 314 is provided to small comparator 300. Although requested address 314 is a 64-bit address, only the 32 least significant bits are provided to small comparator 300, as indicated by line 316, in order to increase the speed of the subsequent partial match check. The least significant bits are used because the least significant bits in an address are least likely to match an address in an address registry. Thus, the likelihood of matching a requested address to a registry address with small comparator 300 is reduced.

In the illustrative embodiment, a false match is undesirable because a false match between the requested address and a registry address results in the program flow being needlessly suspended. A false match refers to a scenario in which a partial match does occur, but a full match does not occur. If the requested address matches an address in the address registry, then the program should be terminated or suspended in such a way as to indicate that the address match did occur, in order to facilitate debugging of the program or hardware. Thus, only true full matches should be detected by the system shown in FIG. 3.

In addition to requested address 314, instructions from instruction dispatch 318 may be provided to small comparator 300 coincident with providing requested address 314. The instructions may be load instructions provided in parallel with the requested address, data indicating that the requested address is valid, and possibly data used to trigger match enablement mechanism 320, which is described in more detail below.

Once requested address 314 is provided to small comparator 300, secondary address registry 324 is accessed in order to perform a partial match check. Secondary address registry 324 is contained in or near the physical area of small comparator 300. Secondary registry 324 contains an abbreviated version of addresses in address registry 322. In an illustrative embodiment, the abbreviated version of address registry 322 contains only the 32 least significant bits of the address information of each address in address registry 322.

In an illustrative embodiment, the registry address bits in registry 322 are transmitted to secondary registry 324 8-bits at a time along specialized registry bus 326, in order to minimize the physical area used in the critical or crowded portions of the processor. However, the 32 least significant bits for each address of the 64-bit registry address information may be transmitted to the small comparator all at once in other embodiments, or more or less than 8 bits may be transferred at a time. Nevertheless, if small comparator 300 accessed registry 322 directly, then a full dedicated bus of 32 wires would be needed.

Once small comparator 300 has received requested address 314 and data from address registry 322 or secondary registry 324, small comparator 300 performs a partial match check by comparing requested address 314 with the addresses contained in address registry 322 or secondary registry 324. A partial match occurs if small comparator 300 discovers a match between the requested address and a registry address.

If a partial match does not occur, then the process or set of instructions requesting the address is allowed to continue execution. If a partial match does occur, then partial match signal 328 is transmitted to program control 304. In turn, program control 304 issues a reject signal, via a means for transmitting a reject signal, that temporarily suspends the program or execution of the set of instructions. A full match check is then performed. The means for transmitting a reject signal may be any suitable means for transmitting a signal in a processor chip.

Program control 304 then transmits a qualified partial match signal 330 to larger comparator 302, which causes larger comparator 302 to perform a full match check. A full match check occurs when all 64-bits of requested address 314, as indicated by line 332, is compared to all 64-bits of each address in address registry 322. A full match occurs if all of the bits of the requested address match all of the bits of one of the addresses in address registry 322.

If a full match does not occur, then the program or the set of instructions is allowed to continue execution. If a full match occurs, then larger comparator 302 optionally causes qualified full match signal 334 to be transmitted to small comparator 300. Larger comparator 302 may also transmit a qualified full match signal directly to program control 304. In this case, program control 304 immediately issues an interrupt command, which causes the program or the set of instructions requesting requested address 314 to stop execution.

Optionally, small comparator 300 may receive qualified full match signal 334. In this case, small comparator 300 causes an interrupt signal 336 to be transmitted to program control 304. In turn, program control 304 issues an interrupt command, which causes the program or the set of instructions requesting requested address 314 to stop execution. The decision to transmit qualified full match signal 334 to small comparator 300 depends on other architectural factors in the processor.

Optionally, match enablement mechanism 320 may be provided to activate or deactivate the address match function of small comparator 300 and larger comparator 302. Match enablement mechanism 320 may be implemented using a switch or macro operably connected to larger comparator 302 and small comparator 300. Match enablement mechanism 320 may also be implemented using a switch or macro operably connected to program control 304. In either case, if match enablement mechanism 320 is activated, then small comparator 300 and larger comparator 302 will operate as described above to perform address matching. However, if match enablement mechanism 320 is not activated, then address matching will not be performed. If match enablement mechanism 320 is not activated, then faster execution of programs or sets of instructions that will not cause a requested address to match an address in the address registry is allowed.

Optionally, match enablement mechanism 320 may be a trigger or may include both a trigger and a switch, as described above. For example, a trigger signal included with instruction dispatch 318 may be provided to match enablement mechanism 320. If the trigger signal causes the trigger to actuate, then address matching will be performed as described above. However, if the trigger signal does not cause the trigger to actuate, then no address matching will be performed. In either case, match enablement mechanism 320 may be set such that address matching will be performed by default, or match enablement mechanism 320 may be set such that address matching will not be performed by default.

In addition, match enablement mechanism 320 may also be an architecturally visible bit or a set of bits included as part of the address registry. Software can enable and disable matching for certain types of instructions, such as only for load instructions or only for store instructions, by setting the corresponding bit in the address registry.

Figure 4:
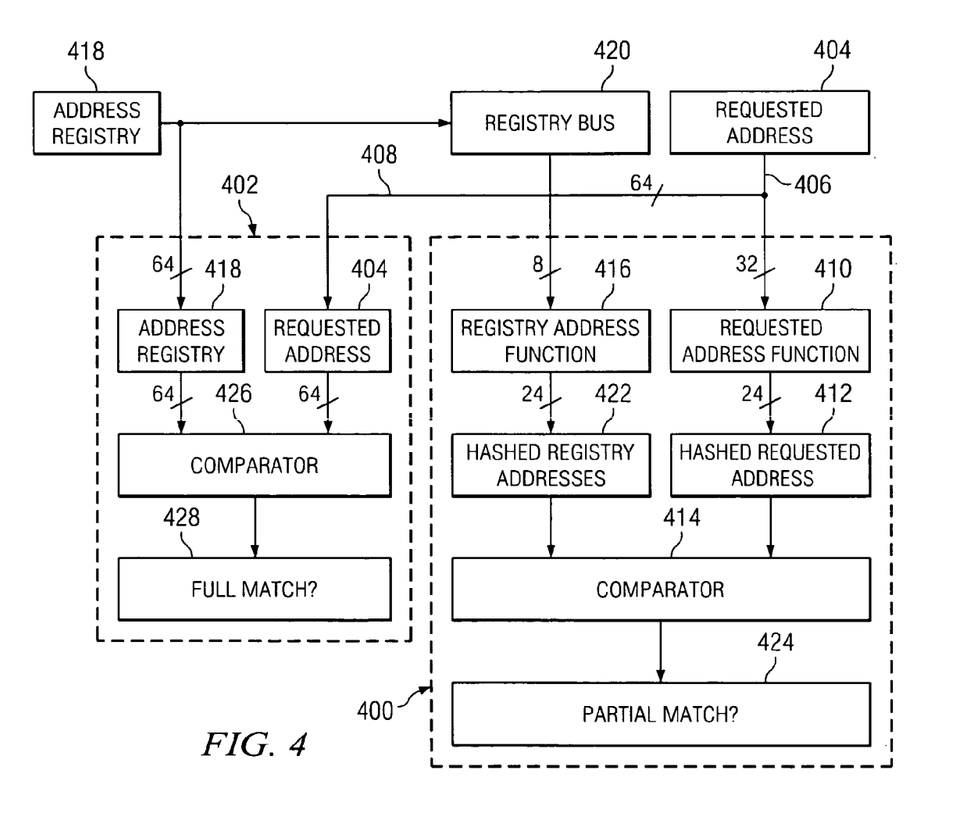
FIG. 4 is a block diagram showing additional detail of the two-part address comparison mechanism shown in FIG. 3, in accordance with a preferred embodiment of the present invention.

FIG. 4 is a block diagram showing additional detail of the two-part address comparison mechanism shown in FIG. 3, in accordance with a preferred embodiment of the present invention. In the embodiment shown in FIG. 4, small comparator 400 corresponds to small comparator 300 in FIG. 3. Similarly, larger comparator 402 corresponds to larger comparator 302 in FIG. 3. Thus, the block diagram shows means for performing a partial address match, a full address match, or both, in accordance with a preferred embodiment of the present invention. The system shown in FIG. 4 is a match check mechanism.

Initially, a program or set of instructions requests a 64-bit address. The request is referred to as requested address 404. Of the 64-bit requested address 404, 32-bits of the least significant portions of the address are transmitted, as indicated by line 406, to requested address hash function 410. In the illustrative embodiment, requested address hash function 410 hashes the 32-bit address to produce 24-bit hashed requested address 412. In other illustrative embodiments, requested address hash function 410 may hash the 32-bit requested address to produce hashed requested addresses having less bits. In any case, hashed requested address 412 is provided to comparator circuit 414. Comparator circuit 414 will compare similarly hashed addresses from hashed registry addresses 422, as described further below.

Subsequent to the request for address 404, the least significant 32 bits of addresses in address registry 418 are provided in 8-bit chunks via registry bus 420 to registry address hash function 416. In general, a requested address or a registry address may be provided 8 bits at a time to a means for performing a partial match check or a means for performing a full match check. However, the requested address is unlikely to be provided 8 bits at a time, because the requested address is the critical timing path and providing the requested address 8 bits at a time would be a relatively slow process. Broadly, the requested address or registry address may be provided at a rate greater than or less than 8 bits at a time, depending on processor architectural design. The means for performing a partial match check may be small comparator 300 in FIG. 3 or any suitable comparator system. The means for performing a full match check may be larger comparator 302 in FIG. 3 or any suitable comparator system.

In the illustrative embodiment, registry address hash function 416 hashes the 32-bit registry addresses to produce 24-bit hashed registry addresses 422. In other illustrative embodiments, registry address hash function 416 may hash the 32-bit registry addresses to produce hashed registry addresses having less bits. In any case, hashed registry addresses 422 are provided to comparator circuit 414. Comparator circuit 414 will compare similarly hashed addresses from hashed requested address 412, as described further below.

Comparator circuit 414 compares hashed requested address 412 to hashed registry addresses 422 to determine whether hashed requested address 412 matches any of the hashed registry addresses 422. If a match occurs, then the comparator circuit outputs a signal to program control 304 indicating that a partial match 424 has occurred. Subsequently, program control 304 issues a reject signal that temporarily suspends execution of the program or set of instructions requesting the address. If no match occurs, then optionally comparator circuit 414 issues a signal to program control 304 indicating that a partial match 424 has not occurred. In an illustrative embodiment, program control 304 assumes that a match does not occur. In either case, program control 304 allows the program or the set of instructions requesting the address to continue execution. Thereafter, the new address may be added to address registry 418, if appropriate.

If comparator 414 indicates a partial match, then program control 304 will cause larger comparator 302 to perform a full match check while the program or set of instructions requesting the address is temporarily suspended. In this case, the entire 64-bit requested address is provided to comparator 426, as indicated by line 408. In addition, the entire 64-bit address for each address in address registry 418 is provided to comparator 426. Subsequently, comparator circuitry 426 compares requested address 404 to addresses in address registry 418 to determine if a match exists. If a match occurs, then comparator 426 outputs a signal 428 to program control 304 via small comparator 300 indicating a full match has occurred. In this case, program control 304 issues an interrupt command that stops execution of the program or set of instructions requesting the address.

If no match occurs, then optionally comparator 426 outputs a signal 428 to program control 304 via small comparator 300 indicating that no match as occurred. In an illustrative embodiment, program control 304 assumes that a match does not occur. In either case, program control 304 allows the program or the set of instructions requesting the address to continue execution. Thereafter, the new address may be added to address registry 418, if appropriate.

Figure 5:
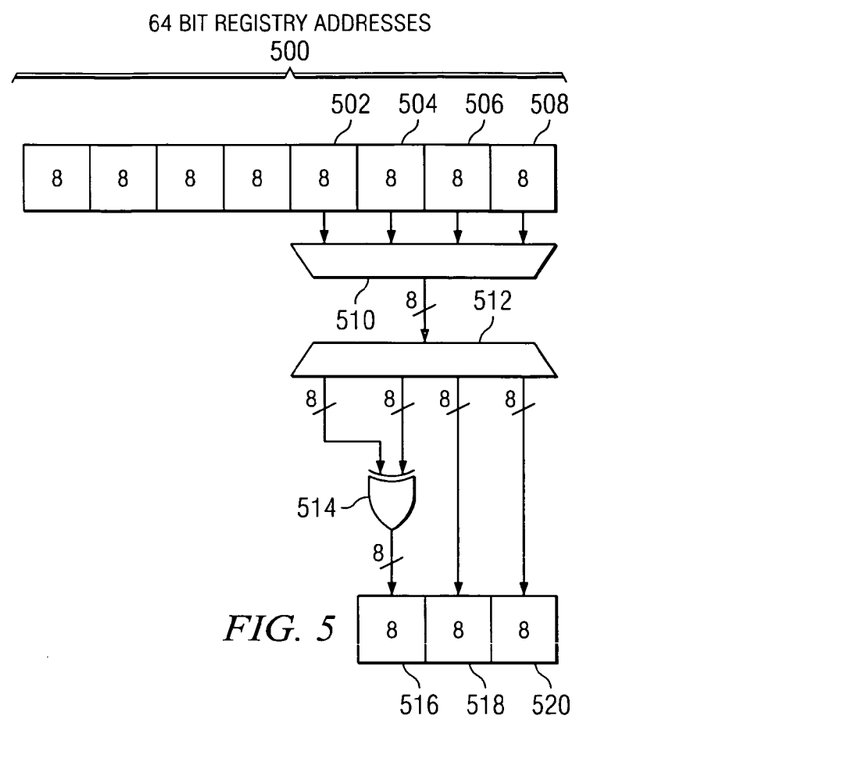
FIG. 5 is a block diagram of a mechanism for hashing a 64-bit registry address, in accordance with a preferred embodiment of the present invention.

FIG. 5 is a block diagram of a mechanism for hashing a 64-bit registry address, in accordance with a preferred embodiment of the present invention. The mechanism shown in FIG. 5 is part of the registry address function 416 shown in FIG. 4. The mechanism shown in FIG. 5 provides for a means for hashing a 64-bit address into a 24-bit address.

Initially, a 64-bit registry address 500 comprises blocks of 8 bits, such as blocks 502, 504, 506, and 508. Block 502 through block 508 are the least significant bits in the address, meaning that these blocks indicate the most exact location of an address. The least significant bits are also most likely to change if the address changes. A partial match is less likely to occur if the least significant bits are compared; thus, in the illustrative embodiment, only blocks 502, 504, 506, and 508 will be used when comparing the requested address to the registry addresses. Because each block contains 8 bits, a total of 32 bits of the 64-bit address is used. In other illustrative embodiments, more or less blocks may be used to create hashed registry addresses.

Subsequently, the bits contained in block 502 through block 508 are transmitted to multiplexer 510. Multiplexer 510 transmits the bits 8 bits at a time to second multiplexer 412. This function is shown broadly in block 326 of FIG. 3. This function is performed for other architectural reasons in the processor design. However, in other illustrative embodiments, the bits contained in block 502 through block 508 may be transmitted directly to second multiplexer 512. The bits contained in block 502 through block 508 may also be transmitted as shown in FIG. 6.

Turning back to FIG. 5, the bits from block 502 and the bits from block 504 are provided to a hashing mechanism 514. Hashing mechanism 514 may be a circuit having an exclusive OR logic gate, or may be any means for hashing the bits from block 502 with the bits from block 504. The output of hashing mechanism 514 is then combined into a new, 8-bit block 516. The other bits from block 506 and 508 are ultimately transmitted to block 518 and block 520 accordingly. Thus, when performing a partial match check, the small comparator will match a 24-bit hashed registry address to a similar 24-bit hashed requested address.

The circuitry used to compare 24-bit addresses uses much less space on the processor chip than the circuitry used to compare 64-bit addresses. Similarly, the speed of performing a match check between 24-bit addresses is much faster than performing a match check between 64-bit addresses. Thus, the partial match check may be performed by a small, fast comparator circuit, as described in reference to FIG. 3 and FIG. 4 above.

Figure 6:
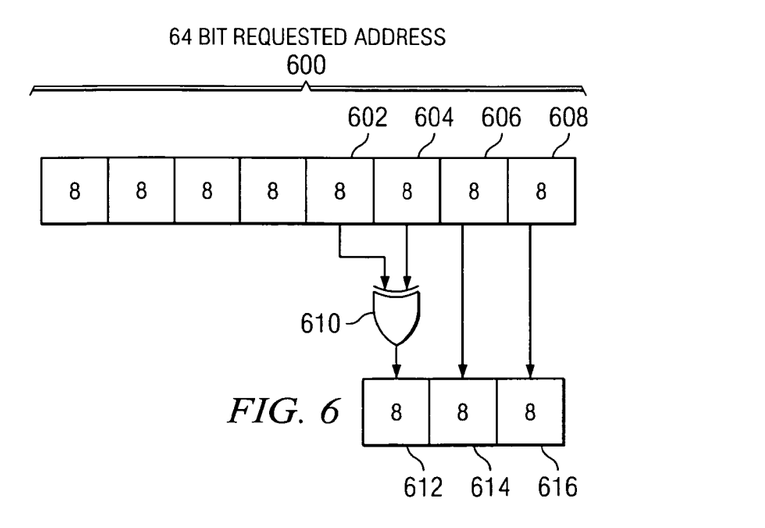
FIG. 6 is a block diagram of a mechanism for hashing a 64-bit requested address, in accordance with a preferred embodiment of the present invention.

FIG. 6 is a block diagram of a mechanism for hashing a 64-bit requested address, in accordance with a preferred embodiment of the present invention. The function of the mechanism of FIG. 6 is similar to the function of the mechanism of FIG. 5, although the function of the mechanism of FIG. 6 uses less steps and less circuitry to implement. The mechanism shown in FIG. 6 is part of the requested address function 410 shown in FIG. 4. The mechanism shown in FIG. 6 provides for a means for hashing a 64-bit address into a 24-bit address.

Initially, 64-bit requested address 600 comprises blocks of 8 bits, such as blocks 602, 604, 606, and 608. Block 602 through block 608 are the least significant bits in the requested address, meaning that these blocks indicate the most exact location of an address. The bits from block 602 and the bits from block 604 are provided to a hashing mechanism 610. Hashing mechanism 610 may be a circuit having an exclusive OR logic gate, or may be any means for hashing the bits from block 602 with the bits from block 604. The output of hashing mechanism 610 is then combined into a new, 8-bit block 612. The other bits from block 606 and 608 are transmitted to block 614 and block 616 accordingly.

The new 24-bit hashed requested address is provided to comparator circuitry, such as comparator 414. Comparator 414 then compares the hashed requested address with hashed registry addresses to determine whether a partial match occurs, as described in relation to FIG. 5. The comparator and program control issue a reject signal or allows the program or set of instructions requesting the address to continue execution, as described in relation to FIG. 5.

In the embodiments shown in FIG. 5 and FIG. 6, of the 32 used bits of an address, two blocks of 8 bits are hashed into one block of 8 bits. However, more blocks of bits may be hashed. Furthermore, in some embodiments, the small comparator may be implemented without hashing blocks of bits.

For example, in another illustrative embodiment of FIG. 5, bits in block 506 may be hashed with bits in block 508, thereby merging blocks 518 and 520 into a single 8-bit block. Thus, the comparator circuitry need only perform a partial match check using 16 bits. Performing a partial match check using 16 bits increases the speed of the partial match check. Similarly, using only 16 bits further decreases the amount of space that the comparator circuitry will use on the processor chip. In addition, it is possible to further hash the blocks into a single 8-bit block for comparison.

However, comparing 8-bit hashed addresses may increase the likelihood of a partial match and thereby increase the likelihood that the slower full match check will be performed, even when no match exists between the requested address and addresses in the registry. A partial match may be referred to as a false partial match if a partial match is indicated, but a full match shows that no match exists between the requested address and addresses in the registry. If too many false partial matches occur, then the benefit of implementing the system shown in FIG. 3 and FIG. 4 is degraded.

In another illustrative embodiment, the small comparator does not hash any of the bits in any of the blocks. In the examples shown in FIG. 5 and FIG. 6, small comparator then compares 32-bit addresses. Doing so increases the time used to perform the partial match check and increases the space used by the circuitry performing the partial match check. On the other hand, using 32-bit address for the partial match check decreases the number of false partial matches.

In other illustrative embodiments, the small comparator uses less than 32 bits of the requested address and the registry addresses when performing a partial match check. Thus, three blocks, two blocks, or one block of bits of the requested address and the registry addresses may be transmitted to the small comparator. If two or three blocks of bits are transmitted, then these blocks may be further hashed, as described above. One block of 8 bits may also be hashed with itself to form a 4-bit block for comparison. Similarly, less than all of the bits in a block may be hashed or used during the partial match check. Similarly, an entire 64-bit address may be hashed into a smaller number of bits. Again, the benefits of using less blocks of bits or using more hashed bits are that the speed of the partial match check is increased and the area used by the corresponding circuitry is decreased. The benefit of using more blocks of bits or using less hashed bits is that the incidence of false partial matches decreases.

Figure 7:
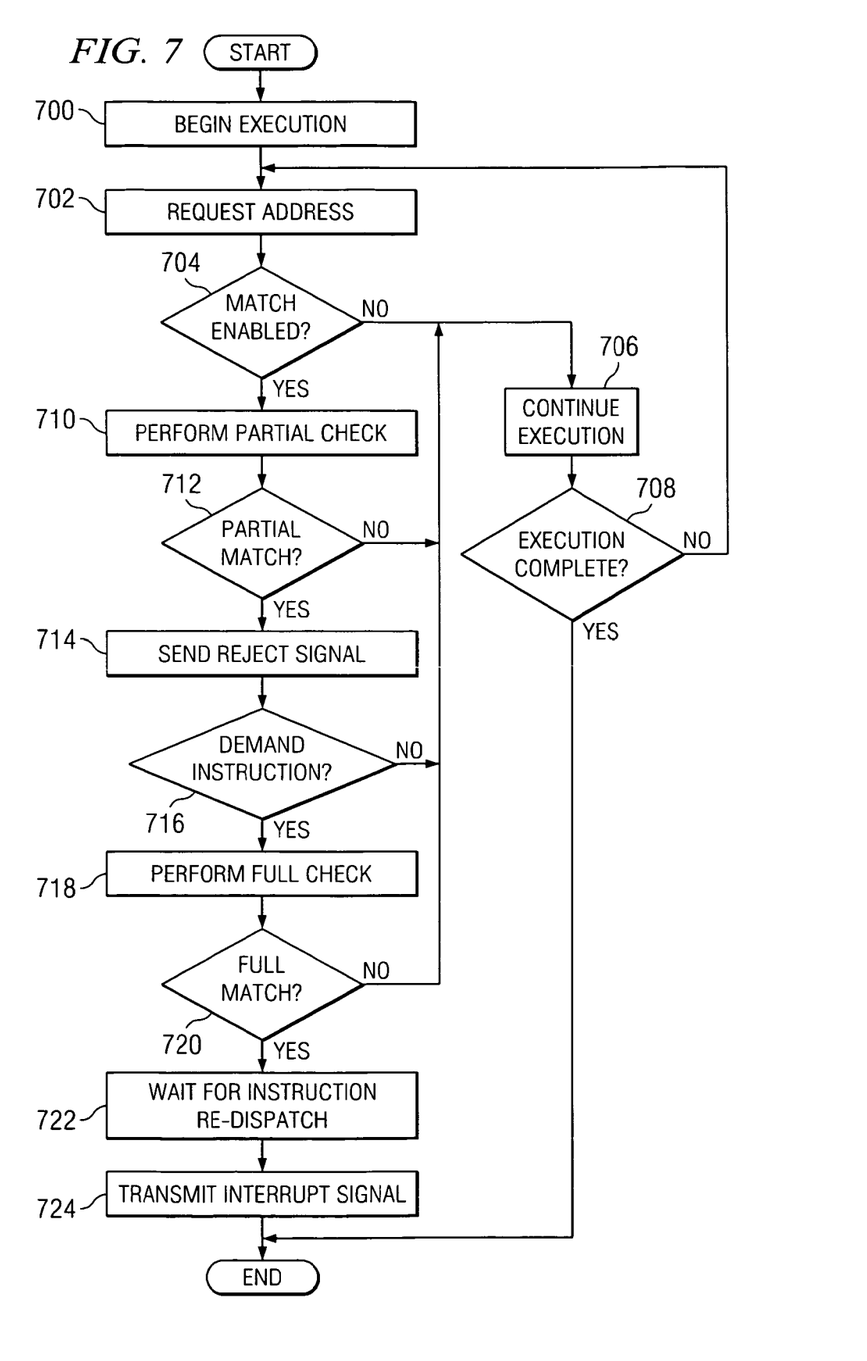
FIG. 7 is a flowchart illustrating a two-part method for address matching in a pipelined processor, in accordance with a preferred embodiment of the present invention.

FIG. 7 is a flowchart illustrating a two-part method for address matching in a pipelined processor, in accordance with a preferred embodiment of the present invention. The method shown in FIG. 7 may be implemented in the systems shown in FIG. 3 and FIG. 4.

The method begins with beginning execution of a program or set of instructions (step 700). The program or set of instructions then requests an address (step 702). A determination is then made if a match enablement mechanism or a trigger will allow address matching to occur (step 704). If address matching is not enabled, then the program or set of instructions is allowed to continue execution (step 706). If execution of the program or set of instruction thereafter completes (step 708), then the process terminates. If the execution is not complete, then the process returns to step 702 with a new request for an address. However, if no new address is requested, then the process terminates.

If address matching is enabled in step 704, then a partial match check is performed (step 710). A partial match check uses some of the available bits in addresses to check whether a full match is possible. For example, a partial match check may be performed using the methods and devices shown in FIG. 3 through FIG. 6.

Next, a determination is made whether a partial match between a requested address and an address in an address registry has occurred (step 712). If no partial match occurs, then the program or set of instructions is allowed to continue execution as described above. If a partial match does occur, then a reject signal is sent to an appropriate mechanism to suspend temporarily execution of the program or set of instructions (step 714). In other illustrative embodiments, the signal may cause the instruction to be terminated and redispatched until a full match check is performed.

A determination is then made whether the request for address is a demand instruction (step 716). A demand instruction is an instruction that is next in line to commit its results to architected state. If the instruction is not a demand instruction, then it is by definition a speculative instruction. In a processor that employs precise interrupt handling, all instructions that are older than the interrupting instruction must have fully completed execution. Therefore, speculative instructions are not allowed to report interrupts, because the older instructions may not have finished executing yet.

If the request for address is not a demand instruction, then a full match check is not necessary. In this case, the program or set of instructions is allowed to continue execution. If the request for address is a demand instruction, then a full match check is performed (step 718). A full match check checks all 64 bits of a requested address against all 64 bits of the addresses in an address registry. The full match check may be performed using the full match check methods and devices described in relation to FIG. 3 and FIG. 4.

After performing a full match check, a determination is made whether a full match exists. If the requested address does not fully match any of the addresses in the address registry, then the program or set of instructions is allowed to continue execution as described in relation to step 706. If the requested address does fully match at least one of the addresses in the address registry, then the processor waits for instruction redispatch (step 722).

The processor waits for instruction redispatch in order to synchronize the reporting of the interrupt with other components of the chip. In the illustrative embodiment, the interrupt is reported in a specific cycle with respect to the dispatch of the instruction. Because the full match takes a relatively long time, that cycle has already passed by the time the existence of a full match is known. Therefore, the program control waits for the instruction to be redispatched so that the interrupt may be reported in the appropriate cycle.

Once the processor has received the instruction redispatch, a program control unit transmits an interrupt command that causes the program or set of instructions to stop execution (step 724). The method terminates thereafter.

Thus, the mechanism of the present invention provides a method, apparatus and algorithm for quickly detecting an address match in a deeply pipelined processor design in a manner that uses a minimum of physical space to implement. An advantage of the mechanism of the present invention is that a small, fast circuit can be used to detect an address match in the physical area around the critical dataflow path in a processor without affecting cycle time, while still providing a fully functional address match mechanism. Thus, the mechanism of the present invention allows program or set of instructions that requests an address to be executed more quickly than prior art matching mechanisms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing an address match check in a processor, comprising:

requesting, by an instruction executing on a processor, an address;

performing a partial match check by comparing a first set of bits included in the requested address to a second set of bits contained in a registry address that is stored in an address registry, wherein the first set of bits corresponds to less than all of a plurality of bits included in the requested address and the second set of bits corresponds to less than all of a plurality of bits included in the registry address;

in response to determining the first set of bits matches the second set of bits, suspending execution of the instruction;

in response to determining the first set of bits matches the second set of bits and the instruction is a demand instruction, performing a full match check by comparing at least remaining bits in the requested address to at least remaining bits in the address registry; and in response to determining the first set of bits does not match the second set of bits, continuing execution of the instruction.

2. The method of claim 1, further comprising:
in response to determining the first set of bits matches the second set of bits and the instruction is not a demand instruction, continuing execution of the instruction.

3. The method of claim 1, further comprising:
in response to all bits in the requested address not matching all bits in the address registry, continuing execution of the instruction.

4. The method of claim 1, wherein the full match check includes:
comparing bits in the requested address not checked during the partial match check to bits in the registry address not checked during the partial match check to form a secondary match check; and
combining the partial match check and secondary match check such that all bits in the requested address are compared to all bits in the registry address.

5. The method of claim 1, wherein the performing a partial match check and the performing a full match check are only initiated when an enablement mechanism is activated.

6. The method of claim 1, wherein the performing the partial match check includes hashing the first set of bits and the second set of bits.

7. The method of claim 1, further comprising:
allowing a set of instructions that includes the instruction that requested the requested address to continue execution when the first set of bits does not match the second set of bits.

8. The method of claim 1, further comprising:
transmitting a reject signal when the first set of bits matches the second set of bits, wherein the reject signal causes a set of instructions that includes the instruction that requested the requested address to suspend execution.

9. The method of claim 8, further comprising:
allowing the set of instructions to continue execution if the full match check does not result in a match between all of the bits of the registry address and all of the bits of the requested address.

10. The method of claim 8, further comprising:
in response to the instruction being re-dispatched, transmitting an interrupt signal when the full match check results in a match between all of the bits in the registry address and all of the bits of the requested address, wherein the interrupt signal causes the set of instructions to stop execution.

11. The method of claim 1, wherein the bits of the registry address are transmitted eight bits at a time to a circuit that performs the partial match check.

12. The method of claim 1, wherein the bits of the registry address are transmitted eight bits at a time to a circuit that performs the full match check.

13. A match check mechanism in a processor of a data processing system, the match check mechanism comprising:
an address registry coupled to the processor, wherein the address registry stores a registry address that includes a plurality of bits;
a first comparator system coupled to the processor, wherein the first comparator system is configured to compare less than all bits of the registry address with less than all bits of a requested address, requested by an instruction, and produce a partial match check at an output, and wherein the partial match check indicates a partial match when the bits of the registry address that are compared to the bits of the requested address match; and
a second comparator system coupled to the processor, wherein the second comparator system is configured to compare at least remaining bits of the registry address to at least remaining bits of the requested address when the instruction is a demand instruction and the partial match check indicates a partial match, and wherein the second comparator system is configured to produce a full match check at an output that indicates a full match if all of the bits of the requested address match all of the bits of the registry address.

14. The match check mechanism of claim 13, further comprising:
an enablement mechanism that, when activated, causes the first and second comparator systems to be operable and, when not activated, causes the first and second comparator systems to be inoperable.

15. The match check mechanism of claim 13, wherein the first comparator system includes a first hasher for hashing bits.

16. The match check mechanism of claim 15, wherein the second comparator system includes a second hasher for hashing bits.

17. The match check mechanism of claim 16, wherein less than all of the bits of the requested address are provided to the first hasher and less than all of the bits of the registry address are provided to the second hasher.

18. The match check mechanism of claim 13, further comprising:
a circuit configured to transmit a reject signal when the partial match check indicates the partial match, wherein the processor suspends execution of a set of instructions that includes the instruction requesting the address in response to receipt of the reject signal.

19. The match check mechanism of claim 13, further comprising:
a circuit configured to in response to the instruction being re-dispatched, transmit an interrupt signal when the full match check indicates the full match, wherein the processor is configured to stop execution of a set of instructions that includes the instruction requesting the address in response to receipt of the interrupt signal.

20. A data processing system comprising:
a bus;
a memory coupled to the bus, wherein the memory includes a plurality of associated addresses:
a processor coupled to the bus;
a match check mechanism coupled to the processor, the match check mechanism including:
an address registry coupled to the processor, wherein the address registry stores a registry address that includes a plurality of bits;
a first comparator system coupled to the processor, wherein the first comparator system is configured to compare less than all of the bits of the registry address with less than all of the bits of a requested address, requested by an instruction, and produce a partial match check at an output, and wherein the partial match check indicates a partial match if the bits of the registry address that are compared to the bits of the requested address match;
a second comparator system coupled to the processor, wherein the second comparator system is configured to compare at least remaining bits of the registry address to at least remaining bits of the requested address when the instruction is a demand instruction and the partial match check indicates the partial match and produce a full match check at an output, and wherein the full match check indicates a full match if all of the bits of the requested address match all of the bits of the registry address.

\* \* \* \* \*